April 5, 1955 B. FISK ET AL 2,705,795
DATA TRANSMISSION SYSTEM
Filed July 6, 1949 6 Sheets-Sheet 1

Inventors
BERT FISK
CHARLES L. SPENCER

By M. A. Hayes

ATTORNEY

Inventors
BERT FISK
CHARLES L. SPENCER

By M. L. Hayes

ATTORNEY

April 5, 1955 B. FISK ET AL 2,705,795

DATA TRANSMISSION SYSTEM

Filed July 6, 1949

6 Sheets-Sheet 3

Inventors
BERT FISK
CHARLES L. SPENCER

By M. C. Hayes

ATTORNEY

April 5, 1955 B. FISK ET AL 2,705,795

DATA TRANSMISSION SYSTEM

Filed July 6, 1949 6 Sheets-Sheet 4

Inventors
BERT FISK
CHARLES L. SPENCER

By M. O. Hayes

ATTORNEY

April 5, 1955

B. FISK ET AL 2,705,795

DATA TRANSMISSION SYSTEM

Filed July 6, 1949

6 Sheets-Sheet 5

Inventors
BERT FISK
CHARLES L. SPENCER

By M. C. Hayes

ATTORNEY

April 5, 1955

B. FISK ET AL 2,705,795

DATA TRANSMISSION SYSTEM

Filed July 6, 1949

6 Sheets-Sheet 6

Inventors
BERT FISK
CHARLES L. SPENCER

By M. C. Hayes

ATTORNEY 2,705,795

DATA TRANSMISSION SYSTEM

Bert Fisk and Charles L. Spencer, Washington, D. C.

Application July 6, 1949, Serial No. 103,283

9 Claims. (Cl. 343—203)

(Granted under Title 35, U. S. Code (1952), sec. 266)

This invention relates to high speed data conveying systems and in particular to pulse type communication systems suitable for high speed operation in which a long distance radio link is employed.

Many systems for data transmission involving a radio link are available in the prior art, however the effects of fading and multiple reflections over long transmission distances impose an ever present limitation upon the speed with which information can be conveyed.

For high speed operation in the delivery of data quantities with a single radio link some form of time sharing or pulse technique is almost essential. Where the radio link is required to operate over only a short distance, such as a line-of-sight distance, high frequency operation in the U. H. F. or V. H. F. regions of the radio spectrum permits such pulse type operation wherein pulses of only a few microseconds duration are suitable to convey the information.

Where the radio link must involve transmission over great distances such as between points which may be typically three thousand miles apart, operation is of necessity limited to the low frequency or the short wave bands in which radio frequency energy reflections between the earth and the ionosphere take place. In propagation by reflection various strata in the ionosphere located at different distances from the earth are effective to produce the reflection. Reflections may occur from these various strata simultaneously, at one instant appearing in phase at a receiving locality and at a later instant in complete phase opposition due to the distance in the length of signal travel when reflecting from the various levels. Also such reflections from the various regions may be subject to rapid amplitude variations at the receiving locality so that at various instants the signal reflected from various strata may be in predominance. With all of these amplitude, relative phase, and time variations of the signals as received it is entirely common to experience a transmission time variation as great as four milli-seconds from one instant to the next over a three thousand mile path. Thus it is possible for a transmitted pulse signal having a one milli-second duration to arrive at a receiving location with portions of energy delayed with respect to other portions to produce an effective widening or extension in which energy may occur over a five milli-second period of time. It is therefore apparent that such prolongation of pulse type energy offers a serious limitation to the speed with which data may be conveyed by long distance radio link whether this data be relative to a single variable quantity or to a plurality of variable quantities. It is therefore apparent that conventional closely spaced pulse type operation which at present sees wide use in the U. H. F. and V. H. F. regions of the spectrum would be completely impractical. As a typical example such a conventional pulse system may provide a recurrent time interval established upon generation of a readily identifiable recurrent reference pulse. This time interval is subdivided into portions in accordance with the number of data quantities which must be transmitted or in accordance with the rapidity with which data from the single source must be transmitted. Each of these intervals may be alloted to a specific data quantity and according to the presence or absence of a signal at a prescribed interval it is possible to deliver information relative to that quantity. For high speed operation these time intervals are made very short and normally would be of only a few microseconds duration. If such short duration pulses were employed for transmission over long distances the pulse widening or delay produced by differences in transmission paths would cause energy from a single pulse to appear in many time intervals thus giving erroneous impressions. An alternative is to transmit long duration pulses such as in the order of one milli-second and make the time intervals separating them of such length that all of the energy received from multiple reflection paths will occur within a single time interval. Since the total pulse widening as previously stated may be of the order of four milli-seconds it is therefore apparent that time intervals in excess of this period of time must be employed and hence high speed operation is seriously limited.

Multipath transmission frequently affects various portions of the signal selectively, one side band or the other or portions of one or the other, or the carrier, in different ways to further confuse or jumble the transmitted energy. It is therefore desirable to maintain the bandwidth of the transmitted signal as narrow as possible. For pulse type operation the bandwidth required for good fidelity is inversely proportional to the pulse duration. Thus to reduce the required bandwidth and thereby circumvent the effects of selective fading it is desirable to employ long duration pulses. Again the long pulses provide a further reduction in the maximum rate with which conventional, previously known, systems can operate.

On the other hand the apparatus of the present invention utilizes the limitations previously set forth providing high speed operation with long duration pulses by overlapping the signals in successive channels with quiet periods between successive pulses in each channel of sufficient duration so that all energy delayed as by multipath transmission of one pulse will be received before the start of a succeeding pulse.

It is therefore an object of the present invention to provide a method and apparatus for increasing the speed with which pulse type energy may operate to deliver data over a long distance radio link.

Another object of the present invention is to provide a method and apparatus for multiplexing information relative to a plurality of quantities in which high speed operation is possible by means of long distance radio wave transmission.

Another object of the present invention is to provide apparatus for rapidly conveying information relative to a plurality of variable quantities in which a high degree of freedom from the aforementioned disadvantages of long distance radio wave transmission is maintained.

Another object of the present invention is to provide apparatus which will multiplex information relative to a plurality of variable quantities and can provide information delivery at present day conventional facsimile speeds.

Other and further objects and features of the present invention will become apparent upon a careful consideration of the subsequent discussion and the drawings which show details of a typical embodiment of the features of the present invention.

In accordance with the broad aspects of the present invention, a data conveying system is provided for high speed operation with a long range radio link. Time sharing pulse type operation with modulation during pulses forms the basis for operation. A sampling recurrence period of operation is employed which is typically at least twice as long as the maximum amount of pulse lengthening due to multiple path reflections. Where a typical lengthening could be four milli-seconds, therefore, the sampling of each data quantity could recur at eight milli-second intervals. For each quantity or each sampling of a single quantity this eight milli-second interval is divided into two portions, a first "signal" period which for purposes of delivering the most signal energy can be equal in duration to one-half the sampling period and a second "quiet" period at least equal to the maximum pulse lengthening. Typically then, the transmission period would last four milli-seconds and the quiet period would also last four milli-seconds however by proper inter-connection, pulse durations other than four milli-seconds may be secured. The transmission periods for each quantity are staggered. A first period for a first quantity or first sampling of a single quantity begins at a reference or "zero" time point, a period for a second sampling or for a second quantity begins after a time delay equal to the sampling interval (8 milli-seconds) divided by the number of quantities, the start of the period for a third quantity or sampling is displaced from the start of the second by the same amount, and so on. Thus for eight quantities or for eight samplings of the same quantity in one sampling interval, four separate and independent transmissions can overlap existing simultaneously.

To provide a way of distinguishing between the signals thus existing simultaneously the transmissions are provided with modulation at different low frequencies for each quantity or each sampling of the single quantity. Information is transmitted in a binary manner, that is, either of two extremes, modulation signal present or absent, is effective to convey data.

Figure 1:
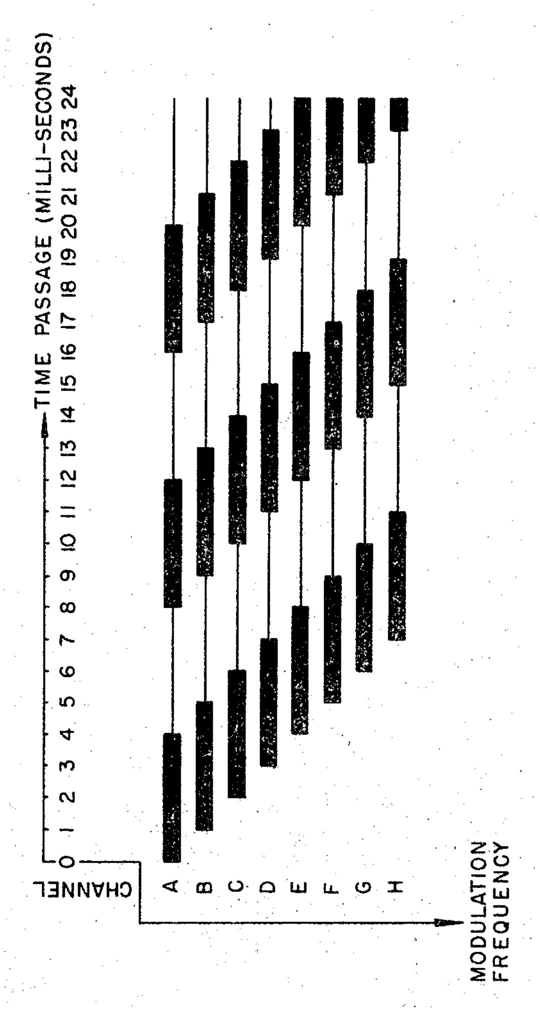
Fig. 1 shows in modified graphical form time sharing arrangements employed by the apparatus of the present invention.

Therefore with such a binary proposition a maximum of four and a minimum of zero modulation signals can exist simultaneously with an average of only two thus providing a substantial economy in power required for modulation and radio frequency signal generation. The representation of Fig. 1 to which reference is now had shows the transmit and quiet periods for eight signal channels in a single sampling period together with their time relationships. For each of the quantities or samplings A, B, C, D, E, F, G and H a wide band indicates a possible transmission period and the time passage coordinate indicates the duration of that period. Fig. 1 therefore shows that at the initial starting point the first four milli-seconds is a period in which transmission may occur relative to channel "A." During a portion of this four milli-second interval transmission can also occur for channels B, C and D, the start of each sampling of each channel being delayed with respect to the sampling of a previous channel by a one milli-second interval. For the binary transmission of data during each of these wide band portions indicated on Fig. 1 a signal will either be present or absent.

Figure 2:
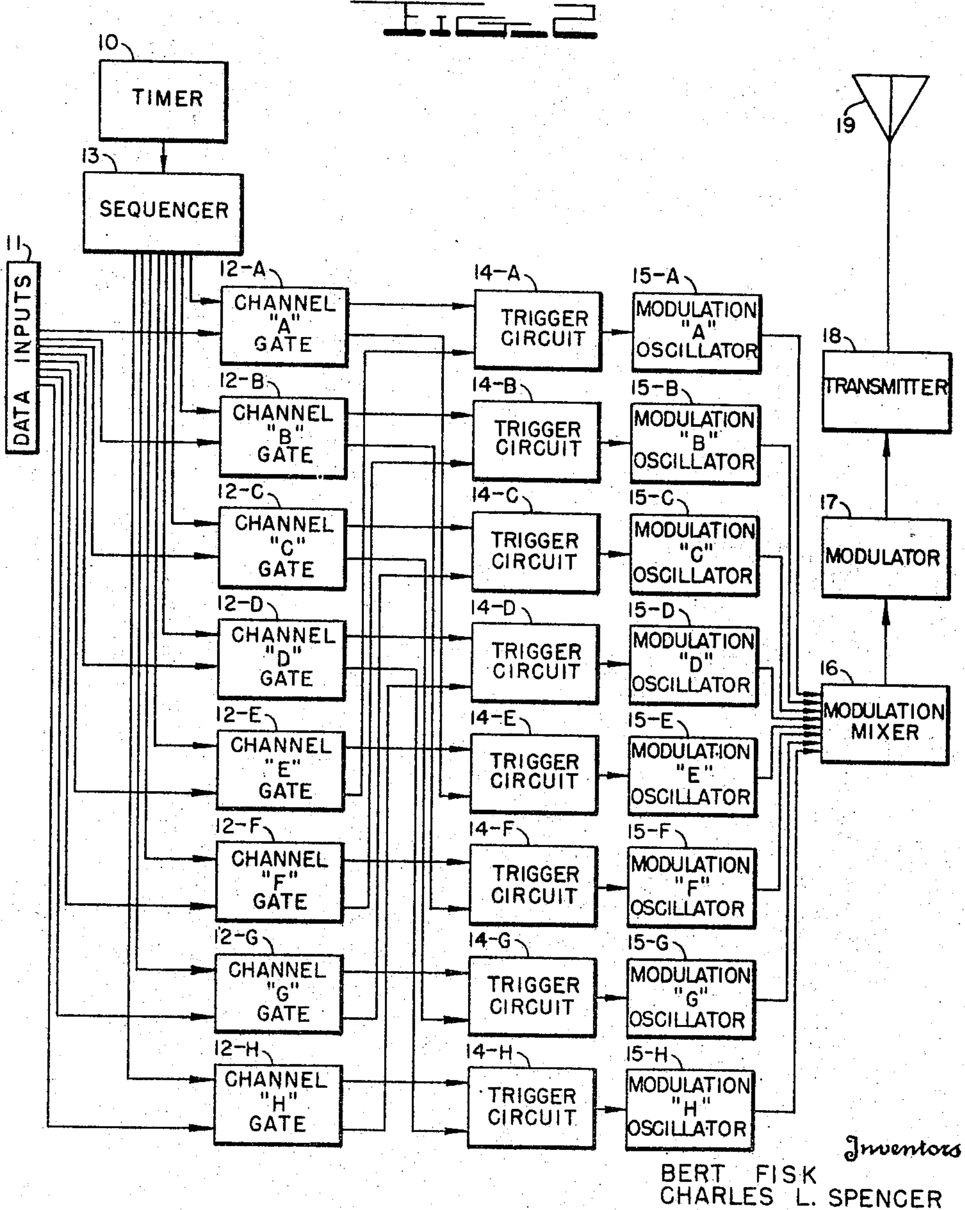
Fig. 2 shows in block form components of the transmitter system of the apparatus of the present invention.

With particular reference to Fig. 2 a block diagram of components located at the transmitting end of the system is shown. The typical arrangement of components as shown may be considered with operation for eight data quantities and sampling of each at intervals of eight milli-seconds, however if high speed operation with only a single data input is required this single data input can be applied simultaneously for sampling at one milli-second intervals. Timing of the system is provided by the timer 10 which may typically produce short duration pulse type signals at one milli-second intervals. Data from inputs 11 may be continuously supplied to the group of gating circuits indicated by the numerals 12A, 12B, 12C, 12D, 12E, 12F, 12G and 12H, which may subsequently be collectively mentioned by the numeral 12. Gating circuits 12 are sequentially rendered transmissive by pulse type input signals obtained from the pulse commutator or sequencer 13. The gating signals delivered to the gating circuits 12 from sequencer 13 are sequential in nature and coincide with the pulses from timer 10. This sequencing is employed in such a manner that a typical first pulse will be supplied to gate 12A to render it transmissive, a second pulse one milli-second later will be supplied to gate 12B, a third pulse to gate 12C, and so on, with the ninth pulse going to gate 12A, the tenth to 12B and so forth.

The individual gates 12 are of such nature as will subsequently be described in connection with Fig. 4, that only when they receive a gating signal from sequencer 13 are they transmissive of the corresponding input data supplied to their respective input terminals 11. For optimum operation it is desirable that the data inputs be in binary form, existing at either of two substantially constant levels in dependency on input information. An example of equipment producing binary type signals might be a plurality of independently operative Teletype or facsimile systems, one for each channel of the present apparatus, or a single high speed operative Teletype or facsimile system providing a signal to all gating circuits 12 in parallel. Therefore the gates 12 will supply output signals responsive to the sequential gating signals if the corresponding binary channel input signal at 11 has one of the possible binary values and no output for binary input at 11 of the opposite value.

Output from each of the gating circuits 12 goes to a group of indepenednt trigger circuits 14A, 14B, 14C, 14D, 14E, 14F, 14G and 14H, which may subsequently be indicated collectively by the numeral 14. The trigger circuits preferably are of a type such as an Eccles-Jordan circuit possessed of two stable states which can be controlled by input signals. These two states may be indentified as "on" and "off" for reasons which will be seen later. The presence of an output signal from the gating circuits 12 is effective to bring the associated trigger circuit 14 from the "off" to the "on" state where it remains until a "reset" pulse is received from sequencer 13 to return the trigger circuit to its "off" condition. In the typical case thus far described the reset pulse occurs four milli-seconds after the "on" condition is initiated. Thus the reset pulse for trigger circuit 14A will occur in time coincidence with the gating signal delivered to gate 12E. The entire sequence of operation with all gates 12 delivering output signals to corresponding trigger circuits 14 has been indicated in Fig. 1. As previously mentioned a time delay in milli-seconds is indicated in one direction and channel letters are indicated in the other. Several complete cycles of operation are shown for each channel and it has been stated that the portions shown by a wide or broad line is indicative of the "on" condition of the respective trigger circuit while the narrow line indicates the "off" condition. From Fig. 1 it therefore may be seen that trigger circuit 14A is "on" in the time interval from zero to four milli-seconds, "off" from four to eight milli-seconds, "on" from eight to twelve milli-seconds, and so on. Circuit 14B is "on" from one to five milli-seconds, "off" from five to nine milli-seconds, "on" from nine to thirteen and so on. At any instant after the starting three milli-seconds, four circuits can be "on" while four will be "off."

Each of the trigger circuits 14A individually controls the operation of a corresponding modulation oscillator 15A, 15B, 15C, 15D, 15E, 15F, 15G and 15H, which will subsequently be referred to collectively simply by the numeral 15. Each of the modulation oscillators may typically operate at an audio frequency in the range of 2400 to 4500 cycles per second. Higher frequencies of modulation can of course be used, however since they will be applied later to a radio frequency power source for modulation, higher frequencies requiring wider bandwidth for transmission are normally less desirable. Each modulation oscillator is adjusted to operate at a different frequency and for a minimum interaction or heterodyne effect the eight modulation frequencies are selected with a three hundred cycles per second spacing and set in accordance with the following schedule:

| Channel: | Modulation frequency |
|---|---|
| A | 4,500 |
| B | 3,600 |
| C | 2,400 |
| D | 3,300 |
| E | 3,900 |
| F | 4,200 |
| G | 3,000 |
| H | 2,700 |

Outputs from the individual modulation oscillators 15 are combined in a modulation mixer 16 and employed to operate a modulator 17 for control of a radio frequency transmitter 18. Energy generated by transmitter 18 is delivered to an antenna 19 for radiation. All of the elements 16, 17, 18 are designed to operate in such a manner that a minimum of cross modulation and heterodyne action between the signals which may exist simultaneously takes place.

The modulator 17 and transmitter 18 operate with very favorable duty cycles. As previously mentioned, information is to be conveyed in binary form, either a signal is present at a prescribed interval or it is not. Thus there is a maximum of four modulation frequencies present in the transmitter output at any instant, and averaged over a few cycles of operation of the sequencer 13, some modulator frequencies will be absent providing an average of only two modulation frequencies which will be present at any one instant. Thus with two signals the transmitter can operate at 50 percent modulation and with four signals at 100 percent modulation assuming equal amplitudes of all modulation signals delivered to modulator 17.

Modulation of the energy from transmitter 18 may be of several forms such as amplitude modulation, phase modulation, frequency modulation or single side band with or without carrier.

Equipment located at a receiving end of the communication system is shown in block form in Fig. 3 and again contains a plurality of similar channels equal in number to the number of transmitter channels. Transmitted energy intercepted by antenna 20 is applied to receiver 21 which has suitable frequency response and detection characteristics to supply as output signals the modulation signals generated by the modulation oscillators 15 of the transmitting equipment. To minimize fade which is ordinarily present to a greater or less degree over such long distance signal paths it is desirable that receiver 21 have effective A. V. C. action and in some cases where fading is severe it may even be desirable to employ a diversity reception system. The modulation signals in the receiver end output are supplied in parallel to a group of frequency selective filters 22A, 22B, 22C, 22D, 22E, 22F, 22G and 22H, subsequently referred to collectively by the numeral 22, tuned to the frequency of the corresponding modulation oscillators 15 of Fig. 2, typically those tabulated above. The filters are inserted to deliver the appropriate modulation signals to the proper channel amplifiers 23A, 23B, 23C, 23D, 23E, 23F, 23G and 23H which will subsequently be referred to collectively by the numeral 23. The channel amplifiers 23 operate in the audio frequency region because of the nature of the output signal from the receiver. To maintain signal amplitude as constant as possible despite fluctuations in input signal amplitude as due to fading in long distance operation, the channel amplifiers are preferably provided with a form of automatic amplitude control of a simple nature which will subsequently be described in detail. With this automatic amplitude control selective fading of the individual signals over a range of twenty *db* was thus compensated.

Amplifier output signals are individually supplied to integrator circuits 24A, 24B, 24C, 24D, 24E, 24F, 24G and 24H which will subsequently be referred to collectively by the numeral 24. Starting from a reference voltage level established by a reset signal each of the integrator circuits 24 produces a voltage output signal in dependency on the amplitude and duration of the input signals in the corresponding channel. The integrator operates substantially as a cycle counter wherein is derived a small increment of voltage in response to each cycle of the modulation frequency signal. Thus as the modulation signals are received the integrator will produce a voltage moving from the reference voltage level of approximately ten volts positive to a maximum of approximately fifty volts negative. The integrator output signal is supplied to a group of sampling gate circuits 27A, 27B, 27C, 27D, 27E, 27F, 27G and 27H subsequently referred to collectively by the numeral 27 which may be typically dual input stages responsive to produce negative or positive polarity signals in dependency upon the amplitude of the integrated signals at a prescribed instant of time.

Operation of the integrators 24 and the sampling circuits 27 is controlled by sequencer 25 in accordance with signals from timer 26. Sequencer 25 and timer 26 may be identical in design and operation to the similarly entitled units 13 and 10 of previously described Fig. 2. Thus a first signal will be supplied from sequencer 25 to integrator circuit 24A to provide reset thereof to the reference level and at the same instant to sampling gate circuit 27E to provide sampling of the integrated signal produced at integrator circuit 24E. Similarly a reverse action will occur four milli-seconds later when a reset signal is supplied to the integrator circuit 24E from sequencer 25 and a gating signal to sampling gate circuit 24A in the four milli-second time interval. A similar interconnection of the integrator circuits 24B and sampling gate circuits 27F, 24C and 27G etc. is provided.

The output from sampling gate circuits 27 is of a special nature existing quiescently at a certain level dropping below this level if the gating signal delivered to sampling gate circuit 27A occurs at such time that the output from integrator circuit 24A has not experienced a negative build-up from its reference level of ten volts positive and existing as a positive signal at the instant of occurrence of the sampling signal if the output from integrator 24A has experienced a negative build-up from the reference level.

As the output signals from the sampling gate circuits 27 occur in eight separate lines, they are readily available to separate utilization devices for separate quantities. Where the data supplied to the transmitter is relative to a single quantity the additional combining circuit 28 is employed at the receiver. Combining circuit 28 shown in detail in Fig. 6 may include a trigger circuit responsive to the negative and positive output pulses from the sampling circuits 27 to produce a single binary form output signal in one line.

Figure 4:
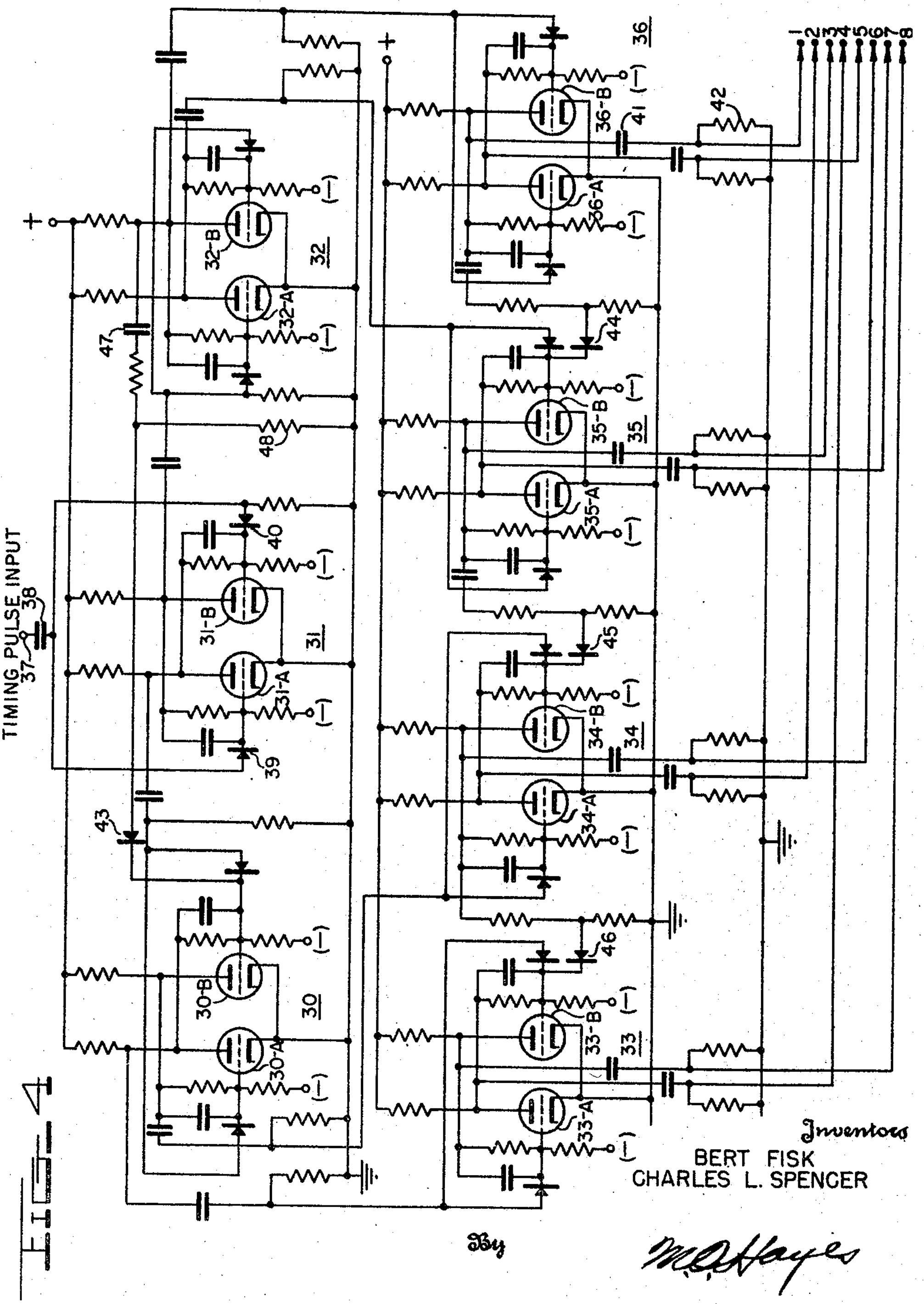
Fig. 4 shows in schematic form details of a sequencer controlling apparatus suitable for use in the present invention.

Details of typical apparatus of the sequencers 13 and 25 which may be identical in structure are shown in Fig. 4. This circuit arrangement is the subject of our co-pending application Serial Number 103,142, filed July 5, 1949, Patent No. 2,557,086, June 19, 1951, entitled "Electronic Commutator Circuit." This circuit has a high degree of stability and employs seven trigger circuits to provide eight output pulse signals in separate lines. Briefly described it employs a plurality of interconnected trigger circuits of a type possessing two stable states, such as an Eccles-Jordan circuit. Upon examination of the circuit it will be seen that in distinction to the more conventional varieties, only seven trigger circuits collectively referred to by the numerals 30, 31, 32, 33, 34, 35 and 36 each having two tubes identified by suffixes A and B are employed to produce eight output signals in the separate lines.

Trigger circuit 31 having tubes 31A and 31B is the primary stage which receives input pulses at one milli-second intervals from the timers 10 or 26 at terminal 37. These input pulses are of short, negative nature or may be obtained as such if the capacitance 38 is part of a short time constant differentiating circuit. Negative pulses thus obtained are supplied through uni-lateral impedance elements 39, 40 to cause an interruption in the current flow through the conductive trigger circuit tube and effect trigger action.

The anodes of tubes 31A and 31B are connected respectively to grids in trigger circuits 30 and 32 through short time constant circuits and unilateral impedance elements polarized to be similarly transmissive only to negative polarity pulses. Thus for example, each time conduction is initiated in tube 31A, a negative pulse is applied to the grids of tubes 30A and 30B and whichever tube is conductive will be cut off producing trigger action in the trigger circuit 30. Similarly the connection of the anode of tube 31B to the grids of tubes 32A and 32B will produce trigger action of the trigger circuit 32 each time tube 31B becomes conductive. In like manner the secondary trigger circuit 30 is connected to tertiary trigger circuits 33 and 34, and trigger circuit 32 to tertiary trigger circuits 35 and 36 through short time constant coupling circuits and uni-lateral impedance elements delivering negative pulses for similar operation.

To illustrate further the operation of the circuits upon application of input pulses to terminal 37 an initial combination of circuit conditions can be chosen in which conduction exists in the following tubes: 31A, 32A, 30A, 36A, 35A, 34B, 33B.

A first negative pulse applied through capacitance 38 will therefore cut off tube 31A bringing tube 31B to conduction. The initiation of conduction in tube 31B will apply a negative pulse to the conductive tube 32A causing triggering of circuit 32 producing thereby a negative pulse at the anode of tube 32B which is operative to interrupt conduction in tube 36A. Thus tube 36B is brought to conduction and tube 36A cut off. For the present discussion it is assumed that the equipment connected to the terminals 1, 2, 3, 4, 5, 6, 7, 8 is responsive only to negative pulses, rendered thus by biasing of tubes or by connection through uni-lateral impedance elements. Only the negative pulse appearing as by differentiation in short time constant circuits such as the one including capacitance 41 and resistance 42 will be "seen" by the connected equipment. It is noted however that simultaneous with the production of this negative pulse at terminal 1, a positive pulse is produced at terminal 5 which may be utilized if desired.

Operation of trigger circuit 31 resultant to this first input pulse is ineffectual for operating trigger circuit 30 because the pulse produced thereby at the anode of tube 31A is positive. Thus following the application of this first pulse the trigger circuits are left in condition with the following tubes conductive: 31B, 32B, 30A, 36B, 35A, 34B, 33B.

A second pulse applied to terminal 37 will again cause operation of trigger circuit 31 bringing tube 31A to conduction applying a negative pulse to trigger circuit of tubes 30A and 30B bringing tube 30B to conduction and subsequently bringing tube 34A to conduction to produce a negative pulse at the anode thereof which is communicated to terminal 2. Following this second pulse then the tubes are left in condition with the following tubes conducting: 31A 32B, 30B, 36B, 35A, 34A, 33B.

A third pulse applied to terminal 37 again operates trigger circuit 31 bringing tube 31B to conduction thereby applying a negative pulse to trigger circuit 32 to bring tube 32A to conduction in turn applying a negative pulse to trigger circuit 35 bringing tube 35B to conduction to produce a negative pulse at terminal 3 and thereby leave the circuits with conduction in tubes 31B, 32A, 30B, 36B, 35B, 34A and 33B.

Similar action occurs upon application of additional pulses to terminal 37 with output negative pulses being produced in sequence at terminals 1, 2, 3, 4, 5, 6, 7, 8.

To establish conduction conditions in the interconnected trigger circuits when power is first applied, additional signal paths including uni-lateral impedance elements 43, 44, 45, 46 are provided. The purpose of these signal paths is to supply corrective negative pulses to the grids of the connected tubes so that after a first cycle of operation which may provide simultaneous output signals from more than one of the output terminals 1, 2, 3, 4, 5, 6, 7, 8, conduction will be appropriately set up in the stages for succeeding cycles of operation. Again these signal paths also include short time constant coupling circuits such as that of capacitance 47 and resistance 48 to facilitate trigger action. It will be noted however that these corrective signal paths are not effective once the trigger circuits achieve proper combinations of conduction such as those previously given in which they will provide ineffective signals such as negative signals to the grids of non-conductive tubes. As previously mentioned, positive signals can also be realized at the output terminals. As the first negative pulse is produced at terminal 1 a positive pulse is simultaneously produced at terminal 5. Also as a negative pulse is produced at terminal 3 a positive pulse is produced at terminal 7. Similarly a negative pulse produced at terminal 6 is accompanied by a positive pulse at terminal 2. Thus it will be seen that the same sequential production of positive pulses will occur as for negative pulses, there being a four milli-second displacement in the timing of a positive pulse and a negative pulse at each terminal.

Figure 5:
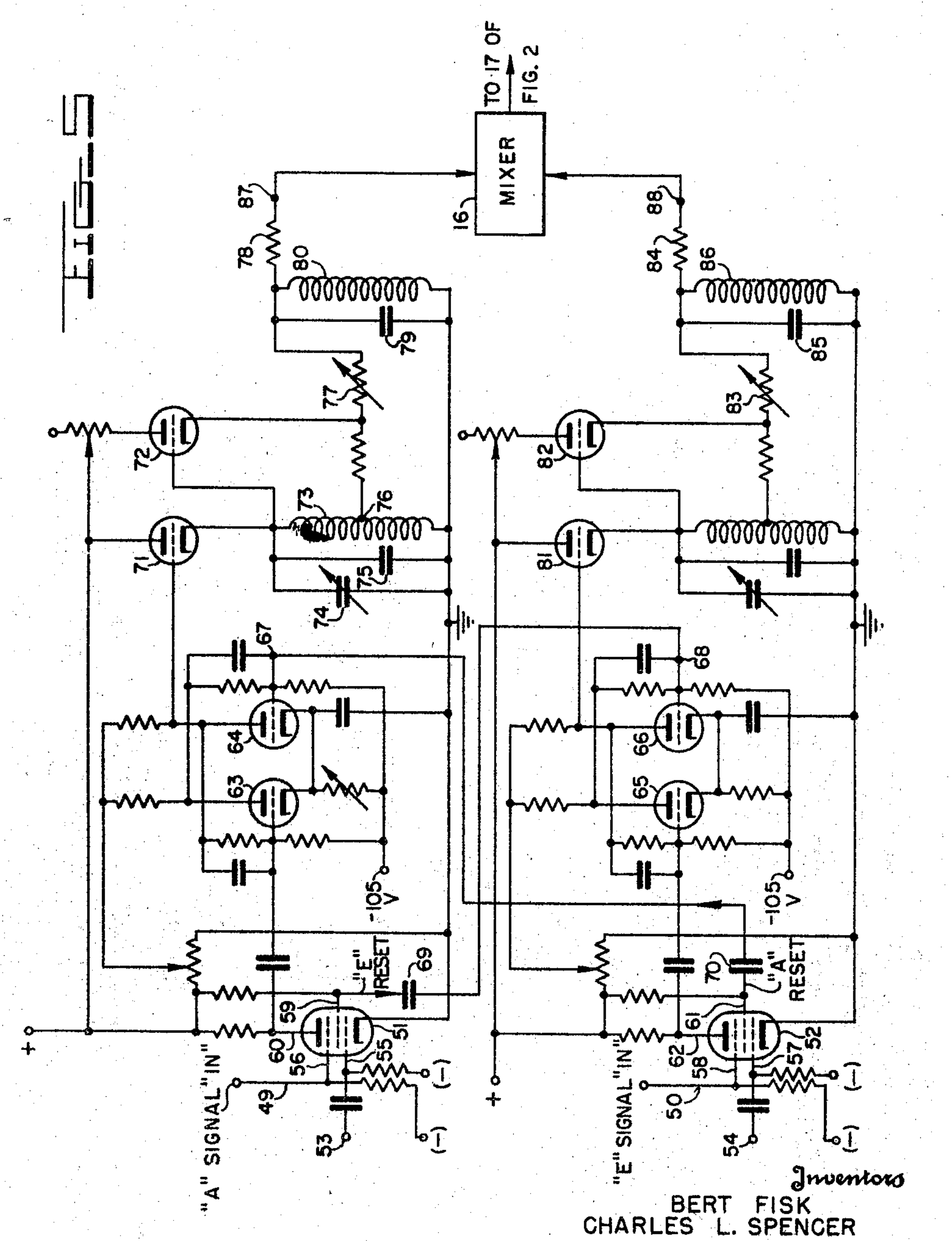
Fig. 5 shows in schematic form typical illustrations of the components employed in the blocks of the transmitter system of Fig. 2.

With reference now to Fig. 5 schematic diagrams of components of the transmitter are shown. To illustrate more fully the operation of the circuits and the interconnections thereof, details of the components for channels "A" and "E" in Fig. 2 have been shown, other connections are made in a similar manner. The "A" input signal is applied to terminal 49 whereas the "E" input signal is applied to terminal 50. A primary component of gate 12A is tube 51 and of gate 12E is tube 52. As required each tube receives two input signals and supplies two output signals, the two output signals occurring in time coincidence and polarity equality. The sequencer output signals are supplied with four milli-seconds time spacing to terminals 53 and 54. Tubes 51 and 52 are normally biased by voltages applied to their grids 55, 56 and 57, 58 so that they are non-conductive however as a sequencer signal is applied to grid 55 for example that grid is unbiased permitting a flow of electrons from the cathode of tube 51 to the grid 59 to produce a negative pulse at that point. If, at the same time the grid 56 is unblocked by an input "A" signal applied to terminal 49, a negative signal will also be realized at the anode 60. Similar connections and output signals with appropriate time displacements are produced at grid 61 and anode 62 of tube 52.

The trigger circuit 14A includes the two tubes 63, 64 whereas the trigger circuit 14E includes the tubes 65, 66. As previously mentioned each of these trigger circuits has two conditions which can be identified as "on" or "off". In the "off" condition for example tubes 63 and 65 are conductive as established by negative reset signals applied to grids 67 and 68 from the grids 61 and 59 respectively. The signal paths providing these interconnections preferably have short time constant coupling circuits such as those including elements 69 and 70. Upon occurrence of a negative signal at anode 60 for example, conduction in tube 63 is interrupted causing trigger action of the circuit, dropping the potential at the anode of tube 64 thereby lowering the potential at the grid of an oscillator control tube 71. Four milli-seconds later a negative pulse from grid 61 in channel E terminates conduction in tube 64 thereby causing the reversion of the trigger circuit to the "off" condition with tube 63 conducting.

Tube 72 is connected in an oscillator circuit having inductance 73 and capacitance elements 74, 75, feedback being provided by the connection of the cathode to point 76. Oscillations of this circuit would normally take place at all times however if control tube 71 is conductive as during the "off" condition of the trigger circuit of tubes 63 and 64 the heavy damping produced thereby prevents normal oscillatory action from taking place. This situation is altered whenever conduction in control tube 71 changes, the sudden change in potential at the anode of tube 64 upon the initiation of the "on" condition produces a surge of voltage across the oscillatory circuit thus setting up an oscillatory action which is sustained by tube 72. At the termination of the "on" period when control tube 71 returns to conduction, oscillations are damped out within a fraction of a cycle. Thus an abruptly starting and stopping series of oscillations is produced at the cathode of tube 72 which is supplied to output circuits. In certain cases such abrupt wave forms have undesirable effects because they may produce shock excitation of other oscillatory circuits associated therewith. For this reason a filter circuit including resistances 77, 78, capacitance 79 and inductance 80 are included. The function of these elements is primarily to make the output signals less abrupt.

The damping tube 81 and oscillator tube 82 associated with the "E" signal channel operate in a similar manner providing an output signal at the cathode of oscillator tube 82 which is oscillatory in nature but of a different frequency from that produced at the cathode of tube 72 during conduction in tube 66 responsive to input "E" signals. Again a filter including resistances 83, 84, capacitance 85 and inductance 86 is provided to render the start and stop of oscillations less abrupt. Outputs from the two oscillators as obtained at terminals 87 and 88 are combined into a single line by mixer 16 for delivery in a single line to modulator 17 of Fig. 2. The reset of the components of Fig. 2 are constructed and interconnected in a manner similar to those thus described for channels "A" and "E". To this end interconnection is made between channels "B" and "F", channels "C" and "G" and channels "D" and "H". As thus described two separate signals "A" and "E" have been applied to the channels. It would be the same for double operation with a single input signal being supplied in parallel to terminals 49 and 50.

Figure 3:
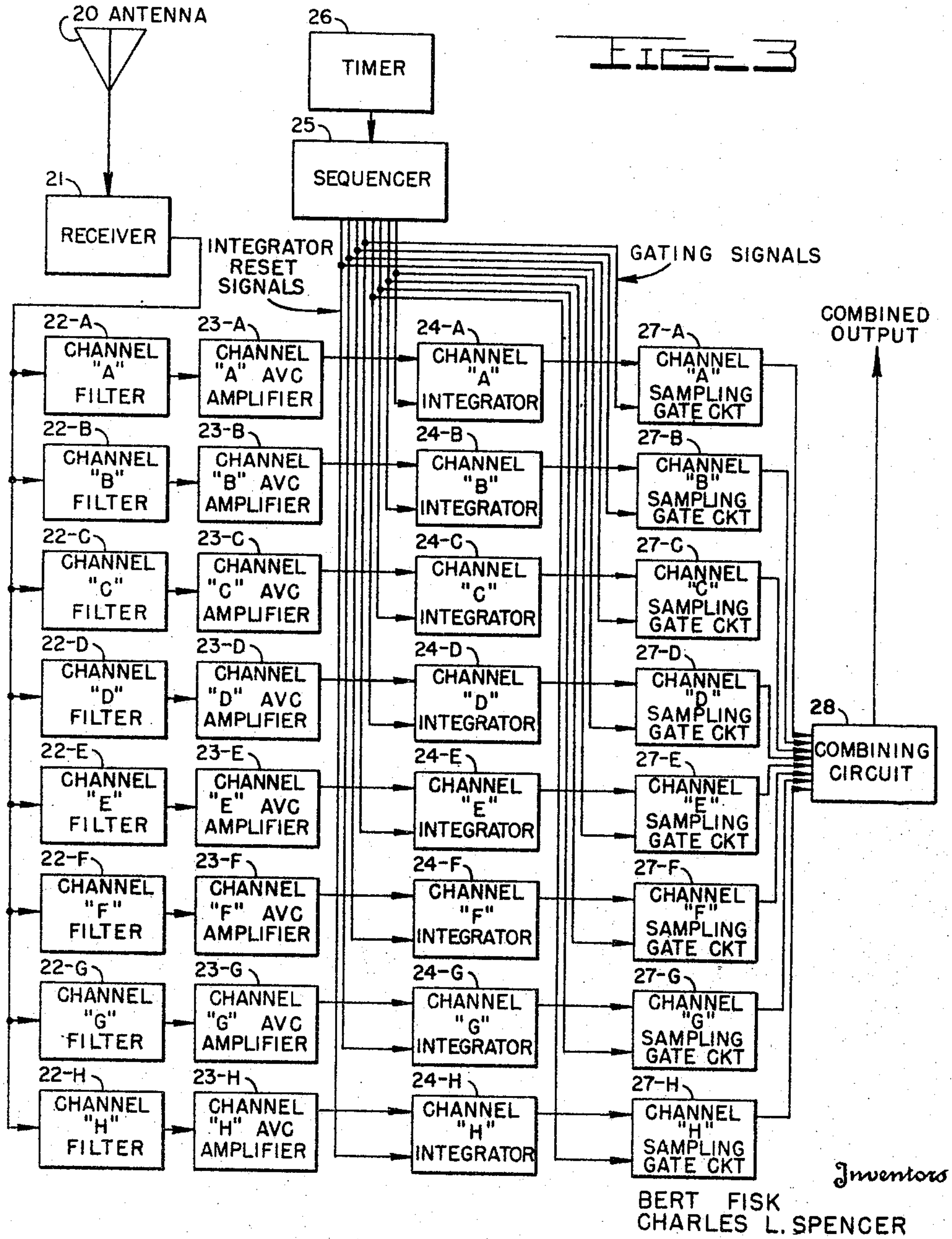
Fig. 3 shows also in block form details of the receiver system of the apparatus of the present invention.
Figure 6:
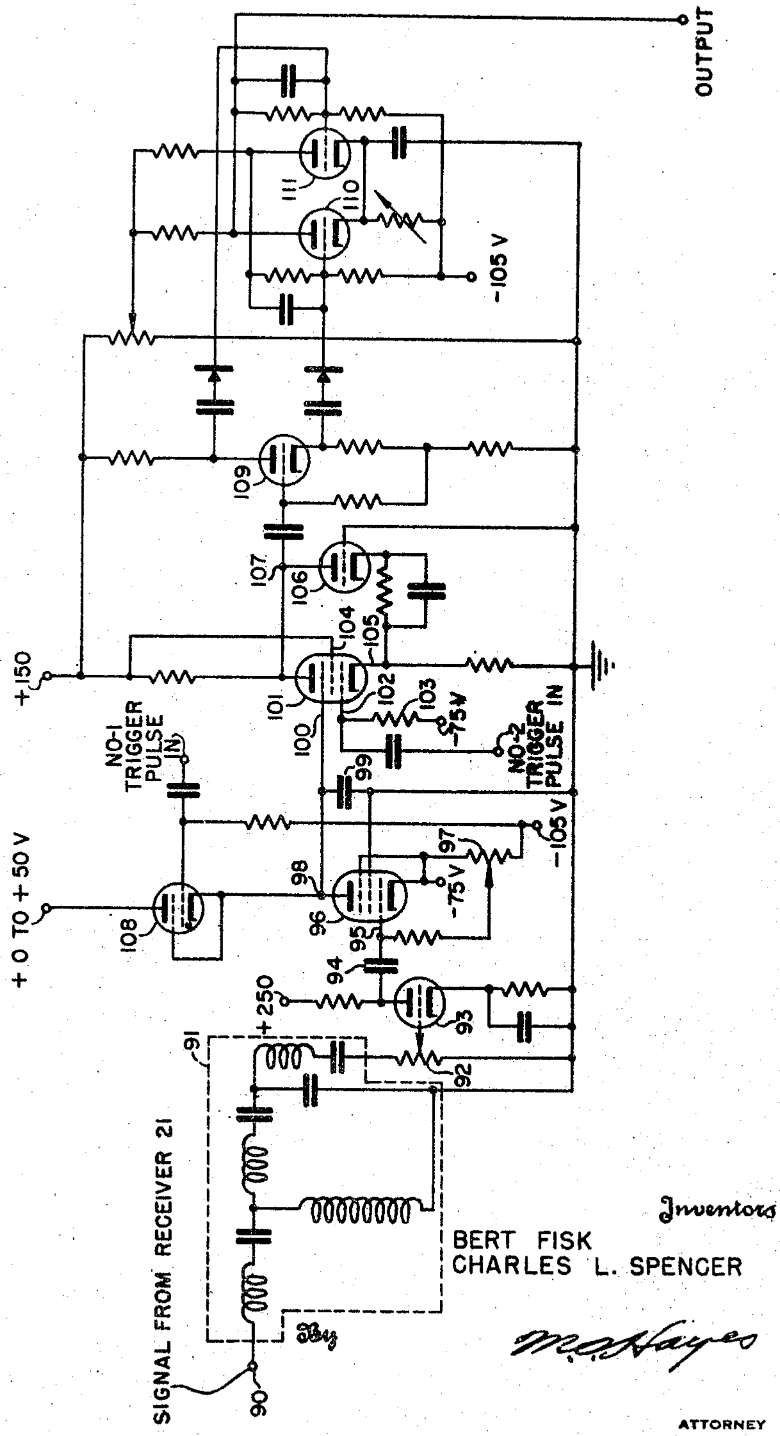
Fig. 6 shows in schematic form typical illustrations of the components employed in the blocks of the receiver system of Fig. 3.

With reference now to Fig. 6 circuit details of the individual components associated with each of the receiving channels of Fig. 3 are shown. Responsive to the receiver output signals applied to terminal 90 is a filter indicated within the dotted space 91. Filter 91 is of any type suitable for operation at the frequency involved which for the typical case of channel A as previously stated would be 4500 cycles per second. It would be equivalent to the filters 22 of Fig. 3. Thus whenever receiver output signals of the frequency of 4500 cycles per second are applied to terminal 90 they will be transmitted through filter 91 and applied to an input potentiometer 92. A portion of these signals is supplied to the grid of tube 93 which provides amplification thereof. Output signals from tube 93 are coupled through capacitance 94 to the grid 95 of tube 96. Grid 95 is provided with heavy bias from potentiometer 97 so that tube 96 is normally non-conductive. Upon application of input signals exceeding a selected amplitude as established by the adjustment of potentiometer 97, tube 96 is brought to periodic conduction during a portion of each cycle of the input signal to produce a pulse of current flow therethrough thus lowering the potential at a junction point 98. Junction point 98 is thus caused to fall in potential with the discharge of capacitance 99 through tube 96 lowering the potential at grid 100 of tube 101. Tube 101 is the primary component of a sampling and gate circuit such as 27A of Fig. 3. Tube 101 also receives input signals at its grid 102 from sequencer 25 (Fig. 3). These signals are positive in nature and of sufficient amplitude to overcome a heavy negative bias applied to grid 102 through resistance 103.

As signals are thus applied to grid 102 from sequencer 25 (Fig. 3) conduction within tube 101 takes place. If the potential of grid 100 is very low so that it is impossible for electrons to flow to the anode of tube 101 this conduction will be limited to that taking place between screen grid 104 and cathode 105 and in such case a positive pulse is produced at cathode 105. This positive pulse when applied to the cathode of tube 106 causes a reduction in current flow into tube 106 thereby producing a positive pulse at the junction point 107. If at the instant that a positive pulse is delivered to grid 102, grid 100 is at a high potential, it will permit the flow of electrons to the anode of tube 101 producing a large amplitude negative pulse at the junction point 107. At the same time however a positive pulse is also produced at cathode 105 which when applied to tube 106 tends to produce an opposing positive pulse at junction point 107. These two signals are opposite in polarity, however with connections shown it is preferable that anode current capabilities of tube 101 be greater than those of tube 106 so that the negative pulse will be approximately twice the amplitude of the positive pulse. Thus a negative pulse results at junction point 107 which is of approximately the same amplitude as the positive pulse produced at that point when tube 106 alone produces a signal there. Thus it is seen that a positive or a negative pulse is produced at junction point 107 at the instant of time at which a trigger pulse is supplied to grid 102 from sequencer 25 in dependency upon the voltage existent at junction point 98 across capacitance 99.

As previously mentioned the voltage across capacitance 99 is set at a reference level which for example may be ten volts positive. Conduction by tube 96 resultant to input signals to grid 95 will lower this potential bringing it down to a minimum potential of approximately fifty volts negative. The reference level is established by means of tube 108 which is preferably of the "soft" variety responsive to first positive input trigger pulses from sequencer 25. Thus a reset signal is applied to tube 108 every eight milli-seconds. Four milli-seconds after each reset pulse a sampling or second trigger pulse is applied to grid 102 of tube 101. Again interconnection of the diametrically opposed circuits "A" and "E" for example is made, the reset signal for one occurring in coincidence with a sampling signal for the other and for all practical purposes may be the same as shown by the connections in Fig. 3.

Thus it is seen that at junction point 107 is obtained an output signal of positive or negative polarity, which is therefore in binary form, in dependency on the binary signal supplied to the typical channel "A" gating circuit 12A of Fig. 2 and may be the preferred type of output where operation with a plurality of variable quantities takes place. For the condition wherein operation is desired on all or several channels with the same input signals it may be desirable to combine these output signals in such fashion that they will be realized in a single line.

Accordingly where all signals are to be combined into one line as for fast operation with a single qquantity on all channels the additional components having tubes numbered 109, 110, 111 are provided, only one tube 106 and associated components being required for all channels. Connections of the anodes of corresponding tubes 101 in the circuit 27 of Fig. 3 are made to junction point 107. Similarly the cathodes of all tubes 101 are connected to cathode 105. Thus each time a negative or positive pulse is produced at junction point 107 in coincidence with each pulse output from sequencer 25 at one milli-second intervals a signal will be applied to tube 109. Tube 109 is biased as an amplifier in a conventional phase splitter circuit having part of the load resistance in the anode circuit and part in the cathode circuit. Thus in response to each negative pulse at junction point 107 a positive pulse is produced at the anode of tube 109 and a negative pulse at the cathode of tube 109 and of the opposite polarities for positive pulses at junction point 107. Tube 109 supplies trigger pulses through differentiating type coupling circuits and unilateral impedance elements to a combining circuit of tubes 110, 111 which is of the Eccles-Jordan type. Each time a typical negative pulse appears at cathode of tube 109, tube 110 if previously conducting will be cut off and if not conducting will not be affected. Thus upon appearance of a pulse at junction point 107, the trigger circuits of tubes 110 and 111 will experience trigger action only if the pulse differs in polarity from the immediately preceding pulse.

A replica of the input signal to the transmitter end of the system is thus obtained at the receiving end of the system in the same form in which it was originally present. A material increase in the speed of transmission has been made possible and improved operation in the presence of severe multiplicity path transmission is effected.

Although specific and certain embodiments of the present invention have been herein disclosed and described, it is to be understood that they are merely illustrative of this invention and modifications may, of course, be made without departing from the scope of the invention as defined in the appended claims.

The invention described herein may be manufactured and used by or for the Government of the United States of America for governmental purposes without the payment of any royalties thereon or therefor.

What is claimed is:

1. A data conveying system comprising, timing means producing a series of timing signals at selectively spaced intervals, a plurality of modulation frequency signal generators, a plurality of gating means, each of said gating means being connected to a modulation generator and each having a timing input terminal and a data input terminal, sequencing means connected to said timing means and having a plurality of output terminals for sequentially producing timing pulses at said output terminals, each of said output terminals being connected to a gating means timing terminal to permit sequential operation of said generators in accordance with input signals for selected overlapping time intervals, signal receptive means, transmission means delivering the data containing signals produced by the modulation generators to the signal receptive means, and receiving sequencing means deriving output signals in accordance with the data contained in the transmitted signals.

2. A system as set forth in claim 1 in which the receiving sequencing means comprises a plurality of filters selectively responsive to the signals produced by the modulation frequency signal generators, a plurality of integrators individually connected to the filters responsive to deliver output signals upon application of signals thereto having selected duration characteristics, and a plurality of sampling circuits individually connected to the integrators responsive to the integrator output signals to produce output signals characteristic of the existence of individual signals produced by the modulation generators.

3. A data conveying system comprising, a selected even number of data input circuits, timing means producing a series of timing signals at selectively spaced intervals, a plurality of modulation frequency signal generators of the selected even number, a plurality of switch circuits of the selected even number each having an "off" and an "on" condition and each connected to one of the modulation frequency signal generators to individually control the operation of the latter, a plurality of individual gating circuits of the selected even number, sequential gate control means connected to said timing means and having said selected number of output terminals for sequentially producing gate control signals at said output terminal, each of said gating circuits being connected to one of said output terminals, to a data input circuit and to a switch circuit to sequentially initiate the "on" condition in each switch circuit upon occurrence of a gate control signal coincident with a selected input data value, signal receptive means, transmission means delivering signals produced by the modulation generators to the signal receptive means, and receiving sequencing means deriving output signals in accordance with the data contained in the transmitted signals.

4. A multiplex data conveying system for long range radio linkage involving multi-path propagation with consequent signal lengthening comprising, a timing signal generator for producing a series of uniformly spaced timing pulses in which the quantity of pulses occurring during a period equal to twice the average lengthening time is equal to the number of multiplex data quantities, gating means connected to the timing signal generator responsive separately thereto and to the data quantities to produce a series of gating signals in partially overlapping sequence for selected values of input data, each gating signal for each quantity beginning with a different timing signal and lasting for a period equal to the average lengthening time, a plurality of modulation frequency signal generators connected individually to the gating means and responsive during the gating signals to produce characteristic frequency signals, signal receptive means, transmission means including a long distance operation radio frequency link delivering the data containing signals produced by the modulation generators to the signal receptive means, and receiving sequencing means deriving output signals in accordance with the data contained in the transmitted signals.

5. In a system for conveying data in the form of a plurality of respective modulation frequency signals transmitted in sequential overlapping time relation, receiving means for recovering the transmitted data comprising a plurality of filters selectively responsive to the respective modulation frequency signals, a plurality of integrators fed by said filters, means for sequentially sampling the outputs of said integrators, integrator reset means for each of said integrators, means connecting each reset means to said sampling means for resetting each integrator a predetermined interval before it is sampled.

6. In a long range radio link multiplex communication system for transmitting a plurality of channel signals in overlapping time relation in a selected sequence with a different modulation frequency denoting each channel, means for receiving said plurality of channel signals comprising a plurality of respective filter means selectively responsive to said respective modulation frequencies, respective integrator means fed by the output of each of said respective filter means, means for selectively sampling the outputs of said respective integrator means in said selected sequence, integrator reset means for each of said integrators, means connecting each reset means to said sampling means for resetting each integrator a predetermined interval before it is sampled.

7. A data conveying system comprising, a sampling means having a single data input and a plurality of data outputs, a plurality of signal generators each having a characteristic frequency, a control circuit for each of said signal generators, time sequencing means sequentially connecting each of said data outputs to one of said control circuits for equal intervals of time, each of said signal generators producing signals of substantially longer duration than said intervals of time in response to the data present in its data output, signal receptive means having a plurality of signal channels each responsive to one of said generator frequencies, transmission means delivering the signals produced by said signal generators to said signal receptive means, and receiver sequencing means connecting each of said signal channels to a single output and deriving signals having a time duration approximately equal to said intervals of time in response to each of the received signals.

8. A data conveying system comprising, a sampling means having a single data input and a plurality of data outputs, a plurality of signal generators each having a characteristic frequency, a control circuit for each of said signal generators, time sequencing means sequentially connecting each of said data outputs to one of said control circuits for equal intervals of time, each of said signal generators producing signals of substantially longer duration than said intervals of time in response to the data present in its data output, signal receptive means having a plurality of signal channels each responsive to one of said generator frequencies, transmission means delivering signals produced by said signal generators to said signal receptive means, said signal receptive means including a plurality of filters responsive to the respective signals of the respective frequencies, a plurality of integrators fed by said filters, integrator sampling means sequentially connecting each of said integrators to a single output and deriving signals having a time duration approximately equal to said intervals of time in response to each of the received signals.

9. A multiplex data conveying system comprising, timing means producing a series of timing signals at selectively spaced equal time intervals, a plurality of modulation frequency signal generators, a plurality of gating means, each of said gating means being connected to a modulation generator and each having a timing input terminal and a data input terminal, each of said gating means including means for switching on its respective modulation generator for a period longer than the interval between consecutive timing pulses in response to coincidence between timing signals and data signals at its input terminals, sequencing means connected to said timing means and having a plurality of output terminals for sequentially producing timing pulses at said output terminals, each of said output terminals being connected to a gating means timing terminal to permit sequential operation of said generators in accordance with data input signals, transmission means delivering the signals produced by the modulation generators to the signal receptive means, and receiving sequencing means deriving output signals in accordance with the data contained in the transmitted signals.

References Cited in the file of this patent

UNITED STATES PATENTS

| | | |
|---|---|---|
| 1,650,944 | Khalifa | Nov. 29, 1927 |
| 1,661,004 | Mills | Feb. 28, 1928 |
| 1,724,227 | Starr | Aug. 13, 1929 |
| 1,886,188 | Hough | Nov. 1, 1932 |
| 2,048,081 | Riggs | July 21, 1936 |
| 2,159,790 | Freystedt et al. | May 23, 1939 |
| 2,273,193 | Heising | Feb. 17, 1942 |
| 2,369,662 | Deloraine et al. | Feb. 20, 1945 |
| 2,459,117 | Oliver | Jan. 11, 1949 |
| 2,465,355 | Cook | Mar. 29, 1949 |
| 2,492,062 | Potter | Dec. 20, 1949 |
| 2,531,817 | Houghton | Nov. 28, 1950 |